(12) United States Patent
Wu

(10) Patent No.: US 7,571,249 B2
(45) Date of Patent: Aug. 4, 2009

(54) SYSTEM AND METHOD FOR ROUTING COMMUNICATION SESSIONS BASED ON PRIORITY, PRESENCE AND PREFERENCE INFORMATION

(75) Inventor: Fuming Wu, Frisco, TX (US)

(73) Assignee: Alcatel Lucent, Paris (FR)

( * ) Notice: Subject to any disclaimer, the term of this patent is extended or adjusted under 35 U.S.C. 154(b) by 838 days.

(21) Appl. No.: 11/108,081

(22) Filed: Apr. 15, 2005

(65) Prior Publication Data
US 2006/0235994 A1    Oct. 19, 2006

(51) Int. Cl.
G06F 15/16 (2006.01)
G06F 15/173 (2006.01)

(52) U.S. Cl. ............ 709/238; 709/203; 709/204; 709/206; 709/207; 709/227; 709/228; 709/239; 709/240

(58) Field of Classification Search ......... 709/203–205, 709/207, 227–228, 238–240
See application file for complete search history.

(56) References Cited

U.S. PATENT DOCUMENTS

| 6,988,132 | B2 * | 1/2006 | Horvitz ............ 709/220 |
| 7,035,923 | B1 * | 4/2006 | Yoakum et al. ........ 709/224 |
| 7,117,245 | B1 * | 10/2006 | Levkoff et al. ......... 709/206 |
| 7,330,895 | B1 * | 2/2008 | Horvitz ............ 709/227 |
| 7,389,351 | B2 * | 6/2008 | Horvitz ............ 709/227 |
| 2002/0051463 | A1 * | 5/2002 | Higuchi ............ 370/466 |
| 2004/0083291 | A1 * | 4/2004 | Pessi et al. .......... 709/227 |
| 2004/0165714 | A1 |  8/2004 | Pinault |
| 2005/0135335 | A1 * | 6/2005 | Hession et al. ........ 370/352 |
| 2005/0216595 | A1 * | 9/2005 | Miyata et al. ........ 709/227 |
| 2005/0223097 | A1 * | 10/2005 | Ramsayer et al. ...... 709/227 |

FOREIGN PATENT DOCUMENTS

| EP | 0872998 A1 | 10/1998 |
| EP | 1648144 A1 | 4/2006 |
| WO | 02075495 A2 | 9/2002 |

OTHER PUBLICATIONS

Schulzrinne, et al.; RPIDS—Rich Presence Information Data Format for Presence Based on the Session Initiation Protocol (SIP); Internet Engineering Task Force (IETF); Feb. 18, 2003; pp. 1-21 internet draft "draft-schulzrinne-simple-rpids-01.txt".

* cited by examiner

Primary Examiner—Nathan J. Flynn
Assistant Examiner—Joshua Joo

(57) ABSTRACT

A communications system includes a presence server for collecting presence information and preference information for a presentity. The presence information includes availability of devices of the presentity, and the preference information includes a priority level for one or more initiators and preference indications for each media type supported by each device associated with the presentity. Upon receiving a request for a communication session of a particular media type with the presentity from an initiator, a communications manager identifies a list of devices of the presentity that support the media type and are accessible to the initiator based on the priority level granted to the initiator. The communications manager then identifies available devices on the list using the presence information, determines a preference value for each of the available devices based on the preference indications and selects one of the available devices having the highest preference value for the communication session.

13 Claims, 4 Drawing Sheets

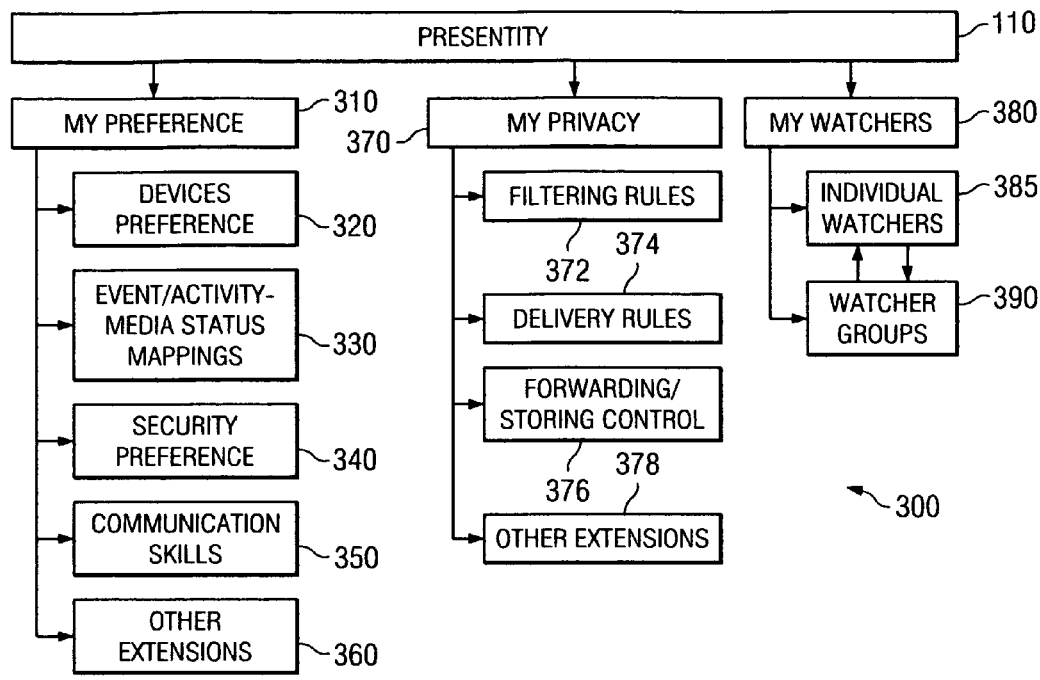
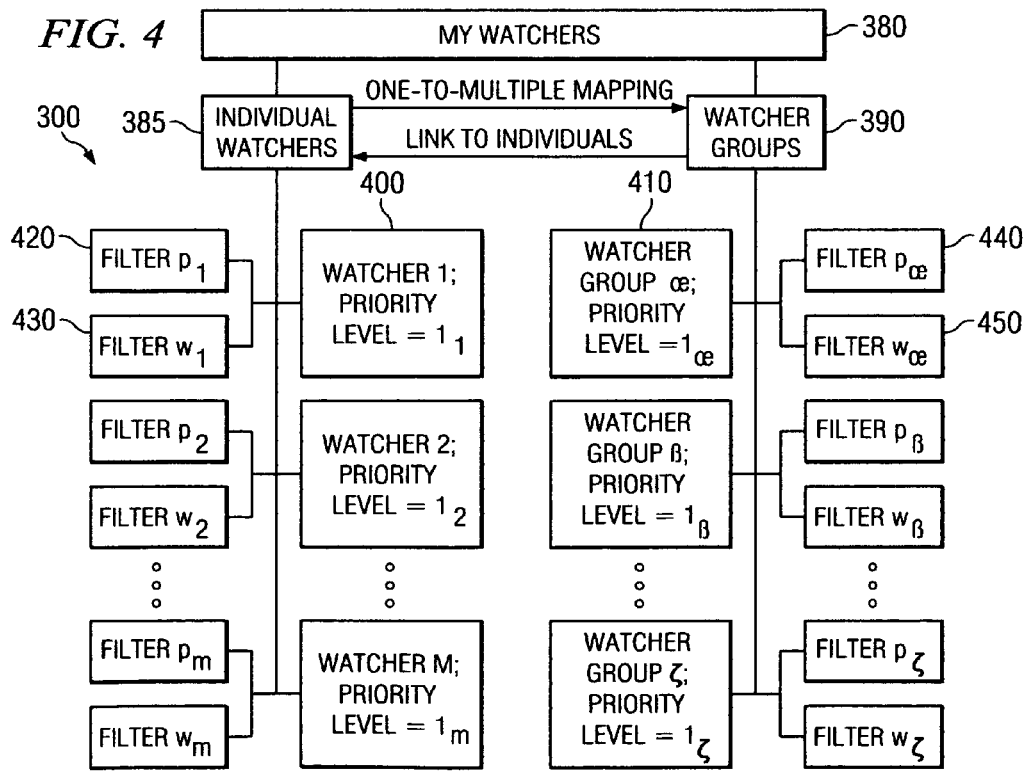

START

610 — RECEIVE REQUEST FOR COMMUNICATION SESSION FROM INITIATOR TO PRESENTITY WITH MEDIA TYPE

620 — DETERMINE PRIORITY LEVEL OF INITIATOR

630 — IDENTIFY DEVICES OF PRESENTITY SUPPORTING MEDIA TYPE AND MEET PRIORITY LEVEL

640 — ANY DEVICES?
- NO → 650 COMMUNICATION SESSION FAILURE
- YES ↓

660 — FILTER IDENTIFIED DEVICES USING PRESENCE INFORMATION OF PRESENTITY

670 — ANY DEVICES?
- NO → COMMUNICATION SESSION FAILURE
- YES ↓

680 — CALCULATE PREFERENCE VALUE FOR EACH AVAILABLE DEVICE

690 — SELECT DEVICE WITH HIGHEST PREFERENCE VALUE

SYSTEM AND METHOD FOR ROUTING COMMUNICATION SESSIONS BASED ON PRIORITY, PRESENCE AND PREFERENCE INFORMATION

BACKGROUND OF THE INVENTION

1. Technical Field of the Invention

The present invention relates in general to a presence-based interactive communications system, and in particular, to routing communications sessions to a presentity from a watcher based on watcher priority information, presentity presence information and presentity preference information.

2. Description of Related Art

Presence-based interactive communication services facilitate more efficient and effective communication sessions by enabling callees (presentities) to publish, in real time, their presence information (such as, the availability, activity, local time, location, current status of the active devices/applications, etc.) and their preference information (e.g., device preferences) to callers (presence watchers). The presence and preference information improves the efficiency of establishing many different types of communication sessions, such as "Click-to-Talk" for real-time voice, "Click-to-Text" for real-time text, "Click-to-MM" for real-time multi-media (video+) and "Click-to-Conferencing" with a particular real-time media type (e.g., voice, text or multi-media).

However, in today's society, presentities typically have multiple devices registered to a network. For example, the current release of Microsoft® Live Communications Server® supports a maximum of 64 devices registered to the server per presentity, and the real-time states of all these devices can be distributed to the presence watchers. Since each device may be capable of running multiple applications, a watcher may have difficulty determining the preferred device and/or preferred application for each media type. Currently, presence systems only allow a presentity to indicate their preferred device, regardless of the real-time state of the presentity's devices or the exact media capabilities of each device. Therefore, based on the current preference information, a watcher may initiate a communication session to the presentity's preferred device, even though that preferred device may not be the device preferred by the presentity for the particular media type.

Moreover, the presentity is currently not able to control which devices a watcher can initiate a communication session towards, which may reduce the presentity's communication and privacy satisfaction. For example, a presentity may want to limit the devices available to the watcher for communication sessions according to different authorities or priorities granted to the watcher by the presentity. Thus, depending upon the importance of the watcher to the presentity or the category of the watcher, the presentity may want to allow the watcher to initiate communication sessions to different presentity devices. As an example, the presentity may want to allow only important watchers, such as the presentity's boss or an important customer, to initiate communication sessions with the presentity's cell phone to reduce cell phone charges. However, current presence systems do not allow a presentity to provide different available devices to different watchers.

Therefore, what is needed is a presence system for allowing a presentity to indicate device/application preferences per media type and to indicate watcher priorities for presentity devices. In addition, what is needed is a communication system and method for routing communications sessions to a presentity from a watcher based on watcher priority information and media type device preference information.

SUMMARY OF THE INVENTION

Embodiments of the present invention provide a communications system for routing a communication session from an initiator to a presentity based on presence information and preference information of the presentity. The communications system includes a presence server for collecting the presence information and the preference information. The presence information includes availability of devices of the presentity, and the preference information includes a priority level for one or more initiators and preference indications for each media type supported by each device associated with the presentity.

Upon receiving a request for a communication session of a particular media type with the presentity from the initiator, a communications manager identifies a list of devices of the presentity that support the media type and are accessible to the initiator based on the priority level granted to the initiator. The communications manager then identifies available devices on the list using the presence information, determines a preference value for each of the available devices based on the preference indications and selects one of the available devices having the highest preference value for the communication session.

In one embodiment, the preference information includes a q-value for each media type supported by the device and/or a q-value for each media type supported by each application running on each device. The presence server computes a total q-value for each of the media types supported on each of the devices from the preference information, and the communications manager selects the available device for the communication session based on the total q-values.

In a further embodiment, the request further includes other criteria for the communication session. The communications manager identifies those devices in the list that also support the other criteria, and selects the available device for the communication session from the list of devices that also support the other criteria.

In still a further embodiment, a media server receives the request for the communication session from the initiator and provides the request to the communications manager. The media server further establishes a connection for the communication session using the selected available device.

BRIEF DESCRIPTION OF THE DRAWINGS

A more complete understanding of the present invention may be obtained by reference to the following detailed description when taken in conjunction with the accompanying drawings wherein:

FIG. 3 illustrates an exemplary preference data structure for a presentity, in accordance with embodiments of the present invention;

FIG. 4 illustrates an exemplary preference data structure including watcher preferences for a presentity, in accordance with embodiments of the present invention;

FIG. 6 is a flowchart illustrating an exemplary process for routing a communication session from an initiator to a presentity based on priority, preference and presence information, in accordance with embodiments of the present invention.

DETAILED DESCRIPTION OF THE DRAWINGS

Figure 1:
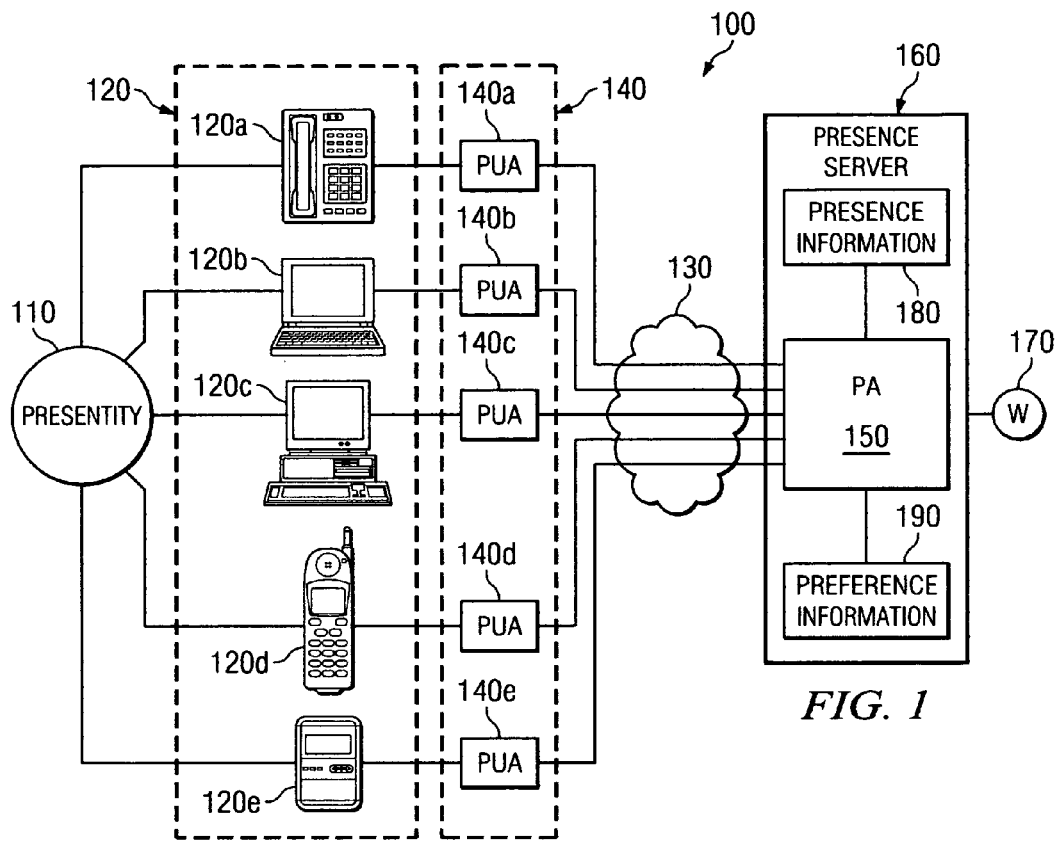
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes a presentity 110 and one or more devices 120 associated with the presentity 110. The presentity 110 represents the callee and provides presence information on the callee's presence status to the presence system 100. Each device 120 is a physical communications device capable of sending and/or receiving communications over a communications network 130. Examples of such devices 120 include, but are not limited to, a desktop phone 120a, a laptop computer 120b, a personal computer 120c, a cell phone 120d and a personal digital assistant (PDA) 120e. In FIG. 1, the communications network 130 represents any type of network over which media (circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each device 120. However, it should be understood that in other embodiments, the number of PUAs 140 can vary based on the number and type of devices 120, the applications supported by the devices 120 and the system configuration. Each PUA 140 independently generates a component of the overall presence information for a presentity 110. Typically, PUA's 140 generate presence information when a change in presence status occurs. Examples of changes in presence status include, but are not limited to, turning on and off a device 120, modifying the registration from a device 120 and changing the instant messaging status on a device 120.

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110. The PA 150 maintains the current complete presence information for the presentity 110 and provides the presence information to one or more watchers 170 (callers or communication session initiators) of the presentity 110. The presence server 160 is a physical entity that can operate as either the PA 150 or as a proxy server for routing requests from watchers 170 to the PA 150. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
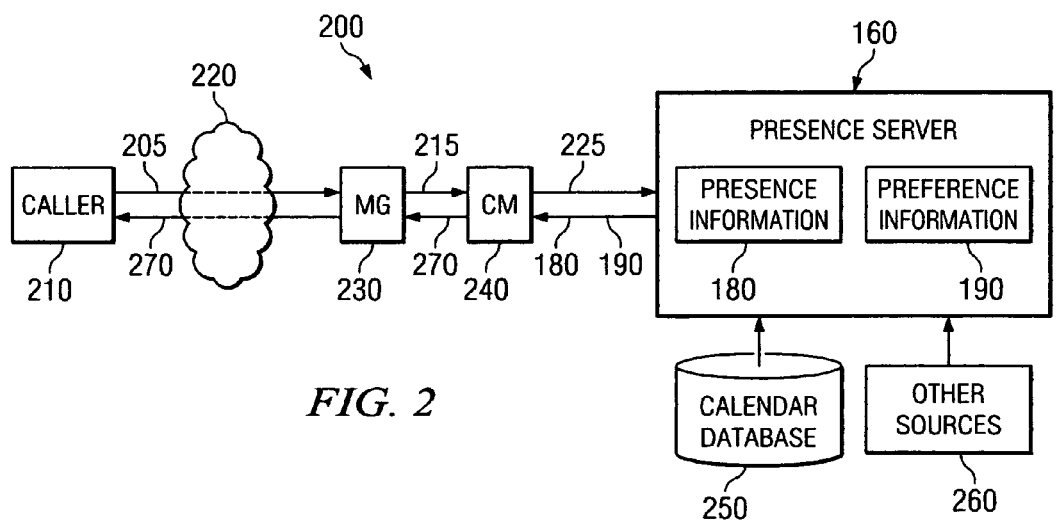
FIG. 2 illustrates an exemplary communications system incorporating a presence system to route communication sessions to presentities based on the presence information and preference information of the presentity in accordance with embodiments of the present invention.

Referring now to FIG. 2, there is illustrated an exemplary communications system 200 incorporating a presence system to route communication sessions based on both the presence information and preference information of the called subscriber (presentity), in accordance with embodiments of the present invention. In FIG. 2, an initiator (caller) 210 sends a request 205 for a communication session (e.g., real-time or non-real-time voice, text or multimedia) with a presentity (called subscriber, not specifically shown) to a media gateway (MG) 230 through a communications network 200 (e.g., PSTN, PLMN, LAN, Internet, etc.). The MG 230 includes any device, such as a circuit switch, IP gateway or other device that converts data from the format required by one type of network to the format required by another type of network. It should be understood that if the caller 210 and the called subscriber are both connected to the same network, the MG 230 may not be necessary.

In response to receipt of the request 205, the MG 230 sends a query 215 to a Communications Manager (CM) 240 for the called subscriber. The CM 240 manages communication sessions for the called subscriber and other subscribers registered with the presence server 160. The CM 240 is typically located on the called subscriber's premises with the presence server 160. However, in other embodiments, the CM 240 may distributed or remote from the presence server 160. The CM 240 may be co-located with the MG 230 or the presence server 160 or may be implemented on a separate device.

The query 215 includes a session identification assigned to the communication session by the MG 230, the identity of the caller 210 (e.g., caller uri), the identity of the called subscriber (e.g., called subscriber uri), the requested media type for the communication session and, in some embodiments, other criteria for the communication session. For example, such other criteria can include the security mode or protocol requested by the caller 210.

Upon receipt of the query 215, the CM 240 sends a request 225 to the presence server 160 for the called subscriber's presence information 180 and preference information 190. The presence server 160 integrates presence information 180 for the called subscriber from internal presence information provided by PUA's (as shown in FIG. 1), a calendar database 250 associated with the called subscriber and other sources 260 of presence information, and sends the integrated presence information 180 back to the CM 240. In an additional embodiment, if the caller 210 is a subscriber to the presence server, the CM 240 may also retrieve the presence information 180 and preference information 190 for the caller 210 from the presence server 160. The CM 240 processes the returned presence information 180 and preference information 190 from the presence server 160 to determine a preferred and available presentity device for the communication session, and transmits device information 270, such as the identity of the device, application and media channel of the preferred presentity device, to the MG 230.

In one embodiment, the preference information 190 includes policies for different priority levels granted to callers by the called subscriber. Thus, the CM 240 compares the identity of the caller 210 to the preference information 190 to determine if the called subscriber has set a specific priority level for the caller 210. Based on the priority level granted to the caller 210 by the called subscriber (presentity), the CM 240 identifies the presentity devices that are available to the caller 210.

For example, an employee called subscriber (presentity) may set a priority level for his/her boss to a high priority level to enable the boss to initiate a communication session to any available presentity device. As another example, the employee called subscriber may set a priority level for a customer to a different priority level than that of the employee's boss to provide different available presentity device options to the customer. For example, if the customer calls the employee called subscriber to inquiry about product information, the priority level of the customer may indicate to the CM 240 that the customer is only allowed to contact the employee at the employee's desktop phone, and not the employee's cell phone. As a further example, the employee called subscriber may set a priority level for an unknown caller to a low priority level to provide minimal presentity device options to the unknown caller. For example, the low priority level may indicate to the CM 240 that there are no device options available to the unknown caller, and therefore, the communication session should be routed to the employee called subscriber's voice mail.

In addition, the preference information 190 also includes presentity device preferences per media type. As an example, the presentity can indicate that for voice applications, the presentity prefers communication sessions to be routed to the presentity's desktop phone, for text applications, the presentity prefers communication sessions to be routed to the presentity's cell phone and for multi-media applications, the presentity prefers communication sessions to be routed to the presentity's PC.

Based on both the priority level granted to the caller 210 by the called subscriber and the requested media type, the CM 240 compares the media type requested in the query 215 to the preference information 190 to determine the preferred device/application of the called subscriber for that media type and priority level. Thus, using the caller priority level and the communication session media type, the CM 240 determines the device/application and associated media channel for connecting the communication session to the called subscriber.

In an exemplary embodiment, the CM 240 determines the preferred presentity device for a communication session by first identifying a list of presentity devices that both support the requested media type and are accessible to the caller 210 based on the priority level granted to the caller 210 by the called subscriber. The CM 240 then filters this list using the presence information of the called subscriber to determine which of the devices on the list are currently available for the communication session (e.g., which devices on the list are in an "on" state and are not currently busy). The CM 240 selects the preferred device/application for the communication session from the available devices based on the presentity device preferences for that media type.

For example, if the CM 240 receives a query 215 associated with a request for a real-time voice communication session from the called subscriber's boss, the CM 240 first identifies the devices (e.g., desktop phone, PC and/or cell phone) that support real-time voice and that are accessible to the called subscriber's boss based on the priority level granted to the called subscriber's boss by the called subscriber. If the called subscriber has granted his or her boss the highest priority level, allowing the called subscriber's boss to initiate communication sessions with any available presentity device, the CM 240 need only identify the devices that either support real-time voice or include an application that supports real-time voice. In this example, the called subscriber's desktop phone, PC and cell phone all support real-time voice.

The CM 240 then accesses the called subscriber's (presentities) presence information to determine the status (e.g., on or off; busy or not busy) of the presentity's desktop phone, PC and cell phone to determine the available devices for the communication session. If more than one of the presentity devices is available (e.g., desktop phone and PC), the CM 240 selects one of the devices for the communication session based on the presentity device preferences for real-time voice communications. For example, if the called subscriber's device preferences indicate that the called subscriber prefers the desktop phone for voice applications, the CM 240 selects the desktop phone for the communication session and transmits the device information for the desktop phone to the MG 230 to establish the call connection between the caller 210 and the called subscriber's desktop phone.

It should be noted that the CM 240 may be constructed or configured using hardware, software, firmware, or combination thereof for managing communication sessions (e.g., real-time and non-real-time voice, text and multimedia communication sessions). As an example, the CM 240 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein. In one embodiment, the CM 240 can include one or more processes, such as software applications providing an activity, a function, or a systematic sequence of tasks that produces a specified result, for managing communications sessions.

FIG. 3 illustrates an exemplary preference data structure 300 for storing the preference information, in accordance with embodiments of the present invention. For each presentity 110, the presence server can store presentity preference information relating to communications 310, privacy 370 and watchers 380. Under communication preferences 310, the presentity can enter device preferences 320, event/activity-media status mapping preferences 330, security preferences 340, communication skills preferences 350 and other types of preferences 360.

For example, under device preferences 320, the presentity 110 can rank his or her devices in order of preferred device and/or preferred device for each media type. As an example, the presentity 110 can indicate that for voice applications, the presentity 110 prefers communication sessions to be routed to the presentity's desktop phone first, and if the desktop phone is unavailable, then to the presentity's cell phone, and if both are unavailable, to the presentity's PC, followed by the presentity's PDA. However, for text applications, the presentity 110 can indicate that the presentity 110 prefers communication sessions to be routed to the presentites' PDA first, and then to the presentity's PC. In addition, for multi-media applications, the presentity 110 can indicate that the presentity 110 prefers communication sessions to be routed to the presentites' PC first, and then to the presentity's cell phone.

Media status is impacted by the presentity's currently activity. Thus, the presentity 110 can indicate the media status of one or more media types depending on the current presentity activity. Media status can be in one of the four states, i.e., Active, In-Use, Busy and Inactive. For example, when a scheduled meeting starts, a notification is sent to the presence server. Examples of event/activity-media status mapping preferences 330 include a preference that when the presentity 110 is in a scheduled meeting, no voice communication sessions are allowed (i.e., the media status of the voice media type is "Inactive"), but text communications are allowed (i.e., the media status of the text media type is "Active").

Security preferences 340 may also be important to the presentity 110 for particular media types and/or communication sessions with particular watchers to prevent real-time and non-real-time unauthorized access to the communication session by a third party. For example, a presentity 110 can specify the preferred supported security protocols per device, per application and per media type.

Communication skills preferences 350 enable a presentity 110 to specify the presentity's language skills and their preference for real-time communications, per device, per application and per media type. For example, a Chinese employee presentity that is able to communicate in English, Chinese and, perhaps other languages can configure his or her language preference such that Chinese is preferred for voice applications, but English is preferred for text applications. In addition, the communication skills preferences 350 enable a presentity 110 to indicate the maximum number of interactions (concurrent communication session) per media type before the media status enters the Busy state.

Under privacy preferences 370, the presentity 110 can enter filtering rules 372, delivery rules 374, forwarding/storing control rules 376 and other types of rules 378. Under filtering rules 372, the presentity 110 can enter indicate the viewing scope of the presentity's presence information per watcher and/or watcher group. For example, a presentity 110 can specify the type and amount of the presentity's presence information that is disclosed to a watcher or watcher group.

Delivery rules 374 enable a presentity 110 to specify the delivery mode (secured/unsecured) of his/her presence information. The delivery mode might be different for various presence attributes depending on their sensitivity. The forwarding/storing control rules 376 equips the presentity 110 with the capability to decide whether his/her presence information is permitted to be forwarded to third parties by a watcher or a watcher group member or saved locally by a watcher or a watcher group member.

Under watcher preferences 380, the presentity 110 can enter individual watcher preferences 385 and watcher group preferences 390. An individual watcher refers to an individual session initiator, while a watcher group refers to one or more session initiators belonging to a group. For example, the "Accounting Department" may be a watcher group, even if the group only has a single watcher. An individual watcher can also be included in multiple watcher groups. The members of a watcher group can be linked to their individual watcher records to avoid the redundancy and maintain the consistency of watcher information. The presentity 110 can grant priority levels to both individual watchers and watcher groups. For example, the presentity 110 can grant everyone in his department (watcher group) a specific priority, but also grant his or her boss a higher priority than the watcher group.

FIG. 4 illustrates an exemplary preference data structure 300 including watcher preferences 380 for a presentity, in accordance with embodiments of the present invention. As discussed above, a presentity's watcher preferences 380 can include both individual watcher preferences 385 and watcher group preferences 390. One specific type of watcher preference for individual watchers 385 is a watcher priority level 400. For each watcher that subscriber to the presentity's presence information, the presentity 110 can enter a priority level 400 for that watcher. In addition, a presentity can enter filtering rules 420 per watcher, and a watcher can also enter filtering rules 430 per presentity. The presentity filtering rules 420 per watcher can be linked to the filtering rules 372 in the privacy preferences 370 shown in FIG. 3 to specify the type and amount of the presentity's presence information that is disclosed to the watcher based on the priority level 400 granted to the watcher.

In addition, each watcher group 390 can be granted a particular watcher group priority level 410 by the presentity, which is linked to presentity filtering rules 440 for the watcher group and watcher group filtering rules 450 for the watcher group. For example, a watcher group's filtering rules 450 can be configured by the owner of the group, or alternatively, can include default filtering rules determined from the union of all the filtering rules of its members who are already watchers of the presentity. In addition, a presentity can configure his or her filtering rules 440 for each watcher group, or, alternatively, the presentity's filtering rules 440 for a watcher group can include default filtering rules determined from the intersection of all the filtering rules the presentity has already configured for the members who are the presentity's watchers.

In the same way, the watcher group priority level 410 can be configured by the presentity, or, alternatively, determined from the priority levels granted to the individual watchers in the watcher group. For example, in one embodiment, the watcher group priority level 410 can be the lowest priority level granted to the individual watchers in the group. In another embodiment, the watcher group priority level 410 can be the highest priority level granted the individual watchers in the group. In a further embodiment, the watcher priority level 410 can be the average of the priority levels granted to the individual watchers in the group.

Figure 5:
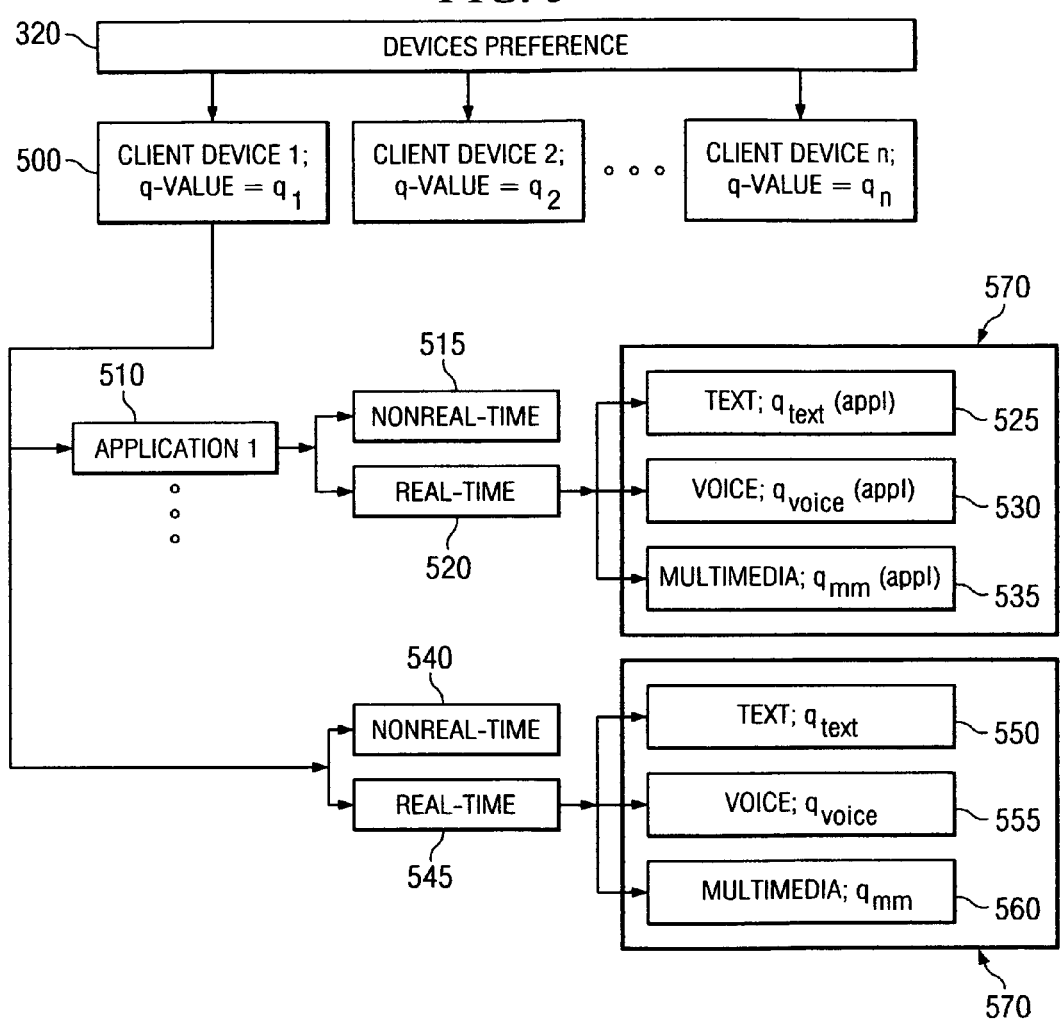
FIG. 5 illustrates an exemplary preference data structure including device/application preferences per media type for a presentity.

FIG. 5 illustrates an exemplary preference data structure 300 including device preferences 320 per media type for a presentity. As discussed above, a presentity 110 may have multiple devices registered with the communications network. The presentity 110 can configure a preference value (e.g., q-value) 500 for each of his/her devices. In one embodiment, a device may be mono-functional, i.e., only one media type (real-time, or non real-time) can be supported. In this embodiment, the preference for this media type is the same as the device. In another embodiment, a device may support multiple media types (real-time 545, or non real-time 540) without any applications running on it. In this embodiment, the presentity 110 can configure a q-value for each of the media types. For example, as shown in FIG. 5, if a device (e.g., Device 1) includes the real-time media types of text, voice and multimedia, the presentity 110 can provide a separate q-value 550, 555 and 560, respectively, for each of the media types. If the presentity 110 indicates his/her devices preferences by configuring a q-value 500 for each device, without configuring any q-values 550, 555 and 560 associated with the media types supported by the device, the q-values 550, 555 and 560 for the media types supported by the device are automatically filled in with the value 1.0 (default q-value).

In a further embodiment, a device may run multiple applications on it. Moreover, a single application 510 (e.g., Application 1) may support multiple media types (real-time 520, or non real-time 515). In this embodiment, the presentity 110 can configure a q-value 525, 530 and 535 for each of the media types (text, voice and multimedia, respectively) supported by each application 510 running on the device. If the presentity 110 indicates his/her devices preferences by configuring a q-value 500 for each device and/or each media type (e.g., q-values 550, 555 and 560), without configuring any q-values associated with the different media types supported by each application 510 running on the device, the q-values 525, 530 and 535 for the media types supported by the different applications 510 are automatically filled in with the value 1.0 (default q-value).

If q-values 550, 555 and 560 are entered for each of the media types in general, and q-values 525, 530 and 535 are entered for each of the media types supported by each application 510 running a device, the combined entered q-values 570 can be used to compute an overall q-value for a particular media type associated with a particular device. For example, for presentity P, assume that he/she has n ($\geq 1$) devices, say D=$\{D_1, D_2, \ldots, D_n\}$, that can be used in communication, and X=$\{\text{text}_{rt}, \text{voice}_{rt}, \text{mm}_{rt}, \text{text}_{nrt}, \text{voice}_{nrt}, \text{mm}_{nrt}\}$ is the set of media types. Also assume that for device $D_k$, there are $s=s_k$ ($\geq 0$) applications A=$\{A_1^k, A_2^k, A_s^k\}$ running on $D_k$ (k=1, . . . , n). Then, for each media type $x \in X$, the q-value of x associated to device $D_k$ can be computed as:

$$q_k(x) = \max \{q_k \times q_x(A_1^k), q_k \times q_x(A_2^k), \ldots, q_k \times q_x(A_s^k), q_x\}.$$

Thus, the overall q-value for a particular media type on a particular device is computed as the maximum q-value entered for that media type on that device by the presentity. The overall q-value for a particular media type on a particular device can be computed and stored as part of the preference information in the presence server, or can be calculated for each requested communication session.

FIG. 6 is a flowchart illustrating an exemplary process 600 for routing a communication session from an initiator to a presentity based on priority, preference and presence information, in accordance with embodiments of the present invention. Initially, at block 610, a request for a communication session with a presentity is received from an initiator. The request includes the identity of the initiator, the identity of the presentity, the requested media type for the communication session and, in some embodiments, other criteria for the communication session. For example, such other criteria can include the security mode or protocol requested by the initiator. At block 620, the priority level granted to the initiator by the presentity is determined from the presentity watcher preference information, and at block 630, a list of presentity devices that support the requested media type are accessible to the initiator based on the priority level of the initiator and meet any other criteria specified by the initiator. If, at block 640, there are no presentity devices that meet all of the initiator criteria, the communication session fails at block 650, and a failure message is generated and sent to the initiator. The failure message can include, for example, an error code identifying the reasons that the communication session failed.

However, if one or more devices are on the list, at block 660, the list is filtered using the presence information of the presentity to determine which of the devices on the list are currently available for the communication session (e.g., which devices on the list are in an "on" state and are not currently busy). If, at block 670, there are no available devices, the communication session fails at block 650, and the failure message is generated and sent to the initiator. However, if there are one or more available devices, at block 680, the overall preference value (e.g., overall q-value) for each available device is calculated for the requested media type. For example, for each device, the overall preference value for the requested media type is the maximum preference value entered for that media type on that device by the presentity. In other embodiments, the overall preference value per media type for each device is pre-determined. At block 690, the preferred device/application for the communication session is selected from the available devices as the device/application with the highest preference value for the requested media type.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A communications system for routing communication sessions based on presence and preference information, comprising:
   a presence server capable of collecting presence information and preference information on a plurality of presentities, wherein said presence information for each of said plurality of presentities includes availability of devices associated therewith and said preference information for each of said plurality of presentities includes a priority level for one or more initiators and preference indications for each media type supported by each of said devices associated therewith; and
   a communications manager connected to receive a request for a communication session with a presentity from an initiator, said request including an initiator identification and a select media type for said communication session;
   wherein said preference indications for each said media type include a respective overall q-value for each said media type computed from respective q-values for each of said media types supported on each of said devices associated with said presentity and respective q-values for each of said media types supported by each application running on each of said devices associated with said presentity;
   wherein said communications manager is operable to extract said presence information and said preference information of said presentity from said presence server, identify a list of said devices of said presentity that support said select media type and are accessible to said initiator based on said priority level granted to said initiator in said preference information, filter said list using said presence information of said select presentity to identify available devices, determine a preference value for each of said available devices based on said preference indications and select a select available device from said available devices having a highest preference value for said communication session.

2. The communications system of claim 1, wherein said communications manager is a software component on said presence server.

3. The communications system of claim 1, wherein said request further includes other criteria for said communication session, and wherein said list of said devices of said presentity support said other criteria.

4. The communications system of claim 1, wherein said communications manager is further operable to provide an error code when there are no available devices.

5. The communications system of claim 1, wherein said initiator is a watcher or a watcher group of said presentity.

6. The communications system of claim 1, farther comprising:
a media server connected to receive said request for said communication session from said initiator and provide said request to said communications manager, wherein said media server is operable to establish a connection for said communication session using said select available device of said presentity.

7. The communications system of claim 6, wherein said communications manager is further operable to provide to said media server a device identity, an application identity and a media channel identity for said select available device.

8. A method for routing communication sessions based on presence information and preference information, comprising the steps of:
providing presence information and preference information for a presentity, said presence information including availability of devices of said presentity and said preference information including a priority level for one or more initiators and preference indications for each media type supported by each of said devices associated with said presentity, said preference indications including a respective overall q-value for each said media type computed from respective q-values for each of said media types supported on each of said devices associated with said presentity and respective q-values for each of said media types supported by each application running on each of said devices associated with said presentity;

receiving a request for a communication session with said presentity from an initiator, said request including an initiator identification and a select media type for said communication session;

identifying a list of said devices of said presentity that support said select media type and are accessible to said initiator based on said priority level granted to said initiator in said preference information;

filtering said list using said presence information of said presentity to identify available devices;

determining a preference value for each of said available devices based on said preference indications; and selecting a select available device from said available devices having a highest preference value for said communication session.

9. The method of claim 8, wherein said request further includes other criteria for said communication session, and wherein said identifying further comprises:
identifying said list of said devices of said presentity that support said select media type and are accessible to said initiator based on said priority level granted to said initiator in said preference information and that support said other criteria.

10. The method of claim 8, further comprising:
providing an error code when there are no available devices.

11. The method of claim 8, wherein said initiator is a watcher or a watcher group of said presentity.

12. The method of claim 8, further comprising:
establishing a connection for said communication session using said select available device of said presentity.

13. The method of claim 12, wherein said establishing further comprises:
establishing said connection using a device identity, an application identity and a media channel identity for said select available device.

\* \* \* \* \*